(12) United States Patent
Fockele

(10) Patent No.: US 9,713,856 B2
(45) Date of Patent: Jul. 25, 2017

(54) PROCESS FOR PRODUCING A SHAPED BODY BY LAYERWISE BUILDUP FROM MATERIAL POWDER

(71) Applicant: Matthias Fockele, Borche (DE)

(72) Inventor: Matthias Fockele, Borche (DE)

(73) Assignee: REALIZER GMBH, Borchen (DE)

(*) Notice: Subject to any disclaimer, the term of this patent is extended or adjusted under 35 U.S.C. 154(b) by 518 days.

(21) Appl. No.: 14/361,156

(22) PCT Filed: Nov. 29, 2012

(86) PCT No.: PCT/EP2012/073937
§ 371 (c)(1),
(2) Date: Jun. 17, 2014

(87) PCT Pub. No.: WO2013/079581
PCT Pub. Date: Jun. 6, 2013

(65) Prior Publication Data
US 2014/0332507 A1    Nov. 13, 2014

(30) Foreign Application Priority Data
Nov. 29, 2011   (DE) .................. 10 2011 087 374

(51) Int. Cl.
*B23K 26/32*   (2014.01)
*B22F 3/105*   (2006.01)
(Continued)

(52) U.S. Cl.
CPC ............ *B23K 26/32* (2013.01); *B22F 3/1055* (2013.01); *B23K 26/342* (2015.10);
(Continued)

(58) Field of Classification Search
CPC .... B23K 26/034; B23K 26/32; B23K 26/342; B33Y 10/00; B33Y 30/00; B33Y 50/02;
(Continued)

(56) References Cited

U.S. PATENT DOCUMENTS 6,995,334 B1 * 2/2006 Kovacevic ........... B23K 26/032
219/121.63
7,045,738 B1 * 5/2006 Kovacevic ........... B05B 7/144
219/121.63
(Continued)

FOREIGN PATENT DOCUMENTS

DE  101 12 591 A1   10/2001
DE  102 08 150 A1    9/2002
(Continued)

OTHER PUBLICATIONS

Search Report received in the German basic application 10 2011 087 374.0 dated Jun. 1, 2012, 5 pgs. (machine translation attached).
(Continued)

*Primary Examiner* — Christopher Kim
(74) *Attorney, Agent, or Firm* — Rothwell, Figg, Ernst & Manbeck PC

(57) ABSTRACT

The invention relates to a method for producing a molded body by building up layers of powdered material, comprising the steps of:
a) preparing a layer of powdered material,
b) heating the layer using controlled radiation by irradiating selected points of the layer according to a cross-sectional pattern of the molded body assigned to said layer according to the geometry description data of the molded body, so that the powdered material is solidified by melting to form connecting regions according to the cross-sectional pattern of the molded body,
c) preparing a next layer of powdered material on the layer irradiated most recently and
d) heating the most recently prepared layer using controlled radiation by radiating selective points of the layer according to a cross-sectional pattern of the molded body assigned to said layer, so that the powdered material is
(Continued)

solidified by melting to form connecting regions according to said cross-sectional pattern of the molded body, and e) repeating steps c) and d) multiple times at least until the build-up of the molded body is complete, wherein the energy application to selected points in radiation steps d) can be varied per unit of time by performing the radiation according to the respective radiation point on the powdered layer.

11 Claims, 6 Drawing Sheets

(51) Int. Cl.
B29C 67/00 (2017.01)
B23K 26/342 (2014.01)

(52) U.S. Cl.
CPC .. *B29C 67/0077* (2013.01); *B22F 2003/1056* (2013.01); *Y02P 10/295* (2015.11)

(58) Field of Classification Search
CPC ........... B22F 3/1055; B22F 2003/1056; B29C 67/0077; Y02P 10/295
See application file for complete search history.

(56) References Cited

U.S. PATENT DOCUMENTS

| | | | |
|---|---|---|---|
| 7,452,500 | B2 | 11/2008 | Uckelmann |
| 8,502,107 | B2 | 8/2013 | Uckelmann |
| 9,399,321 | B2 * | 7/2016 | Ljungblad ........... B29C 67/0077 |
| 2004/0217095 | A1 | 11/2004 | Herzog |
| 2010/0270708 | A1 * | 10/2010 | Jonasson ............... B22F 3/1055 264/401 |
| 2015/0151491 | A1 * | 6/2015 | Teulet .................. B22F 3/1055 700/120 |
| 2016/0121548 | A1 * | 5/2016 | Nauka ................. B29C 67/0085 264/308 |
| 2016/0136731 | A1 * | 5/2016 | McMurtry ............ B22F 3/1055 419/53 |
| 2016/0175929 | A1 * | 6/2016 | Colin ................ C04B 35/62839 419/23 |
| 2016/0175935 | A1 * | 6/2016 | Ladewig .................. B22F 7/02 425/78 |
| 2016/0184891 | A1 * | 6/2016 | Mironets ............... B22F 1/0096 419/53 |
| 2016/0236299 | A1 * | 8/2016 | Oberhofer ........... B23K 26/144 |
| 2016/0243618 | A1 * | 8/2016 | Heugel ................. B22F 3/1055 |
| 2016/0243761 | A1 * | 8/2016 | Okamoto ........... B29C 67/0081 |
| 2016/0257071 | A1 * | 9/2016 | Okamoto ........... B29C 67/0088 |
| 2016/0263825 | A1 * | 9/2016 | Wada .................. B29C 67/0059 |
| 2016/0263829 | A1 * | 9/2016 | Okamoto ........... B29C 67/0081 |
| 2016/0263834 | A1 * | 9/2016 | Wada .................. B29C 67/0088 |
| 2016/0279706 | A1 * | 9/2016 | Domrose ............. B22F 3/1055 |
| 2016/0279873 | A1 * | 9/2016 | Fette .................. B29C 67/0077 |
| 2016/0279881 | A1 * | 9/2016 | Okamoto ........... B29C 67/0088 |
| 2016/0303656 | A1 * | 10/2016 | Lacy ..................... B22F 3/1055 |
| 2016/0303687 | A1 * | 10/2016 | Ljungblad ........... B23K 26/342 |
| 2016/0303798 | A1 * | 10/2016 | Mironets ............. B29C 67/0077 |
| 2016/0305256 | A1 * | 10/2016 | Knittel ..................... F01D 5/28 |

FOREIGN PATENT DOCUMENTS

| | | | | |
|---|---|---|---|---|
| DE | 103 20 085 A1 | | 2/2004 | |
| FR | WO 2016020447 A1 * | | 2/2016 | ........ B29C 67/0081 |
| GB | WO 2015040433 A2 * | | 3/2015 | ........... B22F 3/1055 |
| WO | 2004056512 A1 | | 7/2004 | |
| WO | 2011018463 A1 | | 2/2011 | |

OTHER PUBLICATIONS

International Search Report cited in PCT/EP2012/073937 dated Apr. 17, 2013, 4 pgs.

* cited by examiner

PROCESS FOR PRODUCING A SHAPED BODY BY LAYERWISE BUILDUP FROM MATERIAL POWDER

CROSS REFERENCE TO RELATED APPLICATION

This application is a 35 U.S.C. 371 National Phase Entry Application from PCT/EP2012/073937, filed Nov. 29, 2012, which claims the benefit of German Patent Application No. 10 2011 087 374.0 filed on Nov. 29, 2011, the disclosures of which are incorporated herein in their entirety by reference.

The invention relates to a method for producing a moulded body by building up layers of powdered material according to the preamble of claim 1 and also to a device with the features of the preamble of claim 10.

Generic devices and methods for producing objects by building up layers of powdered material, in particular metallic and/or ceramic material, are already known. The devices comprise a processing chamber housing with a processing chamber, a support structure forming a base for the build-up of layers and for providing a building region in the processing chamber, an irradiation apparatus with components above and opposite the building region for irradiating the most recently prepared powdered material layer on the support structure in a cross-sectional region allocated to said layer of the relevant moulded body to be produced, which radiation melts or possibly sinters the powdered material in this cross-sectional region by heating, and an inert gas conveying apparatus for feeding inert gas through the processing chamber.

With regards to the prior art for such devices reference can be made for example to DE 199 05 067 A1, DE 102 36 907 A1, DE 102 08 150 A1, DE 101 12 591 A1, EP 1 839 781 A2 or DE 196 49 865 A1.

In recent times very effective methods for producing moulded bodies, even those with a complex geometry, have become known that are referred to by the terms selective laser melting, selective powder melting, selective laser sintering and the like, wherein said methods, often included within the terms "Rapid Prototyping" or "Rapid Tooling" or "Rapid Manufacturing", are essentially based on the following principle:

The object to be produced (moulded body) is built up in layers using a fine-grained, powdered raw material according to CAD data or geometry description data derived therefrom, in that the raw material is solidified or melted by irradiating selective points according to a cross-sectional design of the object assigned to the respective layer. In this way the individual layers are also joined together. The irradiation is normally by means of laser radiation, wherein the beam deflecting apparatus for deflecting the laser beam is controlled by means of a control apparatus on the basis of the geometry description data of the object to be produced. The control information is usually derived and prepared from CAD data by a microcomputer or processing computer according to a corresponding program.

The laser beam draws on the most recently prepared layer of raw material the cross-sectional design assigned to this layer of the object in order to melt the raw material selectively according to the cross-sectional design. Such an irradiation step is then usually followed by preparing the next powdered material layer on the layer that has just been melted selectively and in some regions by irradiation. After forming a sufficiently smooth layer of powdered material on the surface another irradiation step is performed in the manner explained above. The object is thus created layer by layer, whereby the consecutively produced cross-sectional layers of the object are melted together such that they adhere to one another. Various metals can be used as the powdered materials including e.g. steel, titanium, gold, tantalum etc. Ceramic powdered material or multi-component powder can also be used for selective laser melting. Furthermore, by means of the method of selective laser melting virtually any conceivable shape of object can be produced, whereby the object is intended for the production of intricate machine elements, prostheses, items of jewelry etc.

Selective laser melting is also denoted by the abbreviation SLM.

To produce a moulded body using the SLM process it is necessary to have complete control of the geometry data of a component. The individual layers are produced according to data on three-dimensional geometry, e.g. a STL dataset. During an irradiation process the laser beam scans the regions to be melted in the respective powdered layer. During this scanning process tracks are formed or also only volume elements of melted metal powder which join together volume element by volume element and layer by layer to form a compact metal part according to the geometry description data of the moulded body. The irradiation parameters include e.g. the laser power, laser modulation, focusing and/or the scanning speed of the laser beam. If the irradiation process is not performed by the continual onwards movement of the laser beam, but by a stepwise onward movement from irradiation point to irradiation point, the scanning speed is defined by the distance between the irradiation points and the duration of stay of the laser beam at the irradiation point, and if necessary by the jump time of the laser beam from irradiation point to irradiation point.

A problem that arises during the layered production of moulded bodies from powdered materials according to the SLM method is that the physical properties of the moulded body being formed vary from step to step with each melted volume element. One reason for this is the permanent change in the thermal conductivity and the thermal capacity of the moulded body caused by the increase in the solidified volume due to remelting during the building up process. The increase in temperature brought about by a specific application of energy per time unit to the respective irradiation point depends heavily on the thermal conductivity of the surrounding region of the irradiation point and also on the thermal capacity of the surrounding region of the irradiation point and on the irradiation absorption capacity at the irradiation point.

The problem here is that the thermal conductivity of the powdered material often differs considerably from the thermal conductivity of the material of the already formed region of the moulded body, which material has already been solidified by remelting during the building process. If the respective irradiation point is surrounded exclusively by powdered material the heat formed at the irradiation point cannot dissipate very effectively and it is very easy for localised overheating of the powdered material to occur far exceeding its melting temperature. However, if the irradiation point in question is surrounded essentially by already solidified material the heat can dissipate more effectively because of the better thermal conductivity of the surrounding region and the irradiation point is not so easily overheated. Based on these effects it was often the case that different regions of a moulded body were remelted depending on its geometry with considerably varying temperatures, resulting in the formation of mechanical stresses in the moulded body and uneven shrinking processes.

DE 103 20 085 A1 describes a method for producing moulded bodies according to the SLM principle, wherein depending on the progress of the melting process during the irradiation of a respective powder layer the energy density of the laser beam and/or its deflection speed and/or the track spacing and/or the strip width are changed automatically. The change is to be performed as a function of the transverse dimension and the temperature of the surface of the molten bath at the irradiation point. The transverse dimension is determined by a CCD camera and the temperature by a pyrometer. The data therefrom is fed to a computer which changes at least one of the aforementioned laser beam parameters when the determined values change.

As an alternative to this DE 103 20 085 A1 describes the change of the laser beam parameter as a function of the respective ratio of surface area to edge length of the surface area solidified by remelting in a respective layer (molten layer). The ratio of the surface area to the edge length of a molten layer can be determined in advance for each layer from the present geometry description data. It has been shown however that the latter procedure for the remelting behaviour only provided a general improvement and only for relatively simple moulded body geometries, as the approach was too crude for more complex geometries.

The first alternative of changing the laser beam parameters as a function of the variables determined in real time optically and pyrometrically, i.e. the transverse dimension and temperature of the molten bath surface at the respective irradiation point, corresponds to a more differentiated and more selective procedure, which can function slightly better even for more complex geometries of the moulded body. However, this alternative is expensive in terms of high instrumentation and measuring costs and involves a high real-time data-processing cost for the measurement detection and evaluation processes with respect to the CCD camera data and the pyrometric measurement values.

The objective of the present invention is to improve a method having the features of the preamble of claim 1 at little cost such that the remelting process when irradiating the powder can be performed with a more even temperature distribution even for complex moulded body geometries and the relevant moulded body can be produced with fewer internal mechanical stresses and with less distortion than previously.

To achieve this objective a method is proposed having the features of claim 1. In this case in irradiation steps d) the application of energy to selected points per unit of time to a respective irradiation point on the respective layer is selected as a function of the thermal conductivity of a defined, three-dimensional, immediate surrounding region of the irradiation point and modulated automatically accordingly by setting irradiation parameters, such as the energy density at the irradiation point and/or the duration of the irradiation at the irradiation point.

The method according to the invention enables complete control of all of the essential building parameters, such as the laser power, the laser scanning speed etc. in each individual volume element of the moulded body being formed during the building phase. The basic concept was to divide the STL data representation of a moulded body into numerous small volume elements (voxels) and control the melting conditions of each of said voxels. The melting parameters are preferably determined by a theoretical voxel model calculation. Said voxels have a varying amount of neighbours according to their respective position. Thus for example voxels with fewer neighbours are located at the edges of the moulded body or in overhanging sections.

During the production of moulded bodies according to the SLM principle the moulded bodies are usually divided in their digital STL data presentation into layers with layer thicknesses from a range of typically 20-50 μm, wherein other layer thicknesses are also possible. According to this division of layers the relevant moulded body is then produced layer by layer in the SLM machine from the powdered material. According to the present invention so-called heating patterns can be calculated layer for layer which define the regions with different thermal properties. Onto said regions geometrical structures, such as dot or vector structures, can be mapped which can be converted by variable laser power, laser scanning speed or the like during the building process by scanning with the laser beam. The energy parameters are calculated preferably by means of a processing computer, wherein a theoretic model is used as the basis for said calculations, which provides, as a measure of the thermal conductivity of the surrounding region of a voxel or current irradiation point in or on the layer currently to be irradiated, the volume amount of material already solidified by melting powdered material within a defined, three-dimensional, immediate surrounding region of the voxel or irradiation point. The remaining volume amount then normally consists of powdered material.

During the building process of the moulded body the change of respective thermal conductivity properties influences the local uptake of energy into the respective volume elements for remelting the powder. A volume element of this kind can preferably be defined by the layer thickness and the minimum smallest region that can be remelted at the irradiation point by laser irradiation. Such a volume element (voxel) can typically be 100 μm×100 μm, × powder layer thickness. Of course, other dimensions of the volume elements are also possible. In particular, with the surrounding region calculations also larger volume elements can be defined which can extend for example respectively over a plurality of layers.

A particular advantage of the present invention is to perform energy applications with high resolution and at selected points and without additional measurement costs. The invention thus enables the production of moulded bodies with low tension, even those with more complex geometries, with alternating delicate and more extended moulded body regions.

The defined, immediate, three-dimensional surrounding regions of the irradiation points change from irradiation point to irradiation point and extend preferably over a plurality of layers, in particular over at least three layers and more preferably over at least 100 layers in a downwards direction below the current irradiation point. Said surrounding regions can preferably have the same shape and same volume, such as a cube shape, hemisphere or pyramid form.

Developments of the method according to the invention are described in the subclaims 2-9, wherein in particular the procedure according to claim 5 represents a very simple manner of determining the thermal conductivity. Determining the thermal conductivity is defined as determining a substitute variable, which represents in particular an at least approximate proportional measure for the thermal conductivity. Therefore, within the scope of the invention there is no need to determine and calculate the exact thermal conductivity of the surrounding region of a respective irradiation point.

In the simplest case as a substitute variable the volume elements (voxels) of the moulded body to be produced can be used which lie in a respective defined surrounding region and have already been solidified by remelting the powder, as shown in particular in claims 5 and 6. Furthermore, this quantity of already solidified volume elements can be weighted further by at least one other parameter, such as the number of neighbouring elements contacting the volume element assigned to the irradiation point directly.

The smaller the substitute variable for thermal conductivity, the lower the energy application per unit of time at the irradiation point. In this way the temperatures generated during the remelting procedure at the irradiation points no longer vary as much, which was previously the case with conventional SLM methods.

As already mentioned, said volume elements are preferably cubes or cuboids with a height corresponding to the respective layer thickness during the building up in layers of the moulded body, wherein said volume elements can be arranged exactly adjacent to one another in the layers. Alternatively, also larger volume elements and differently dimensioned surrounding regions can be considered.

According to the present invention it is thus possible for each volume element assigned to an irradiation point of the moulded body to be produced to store a dataset for irradiation parameters in the memory of the processing computer, which dataset is retrieved during the building process to control the laser accordingly. In this way tolerance ranges for the thermal conductivity of the defined surrounding regions of the irradiation points are defined such that the energy application per unit of time at the respective irradiation point is not varied from irradiation point to irradiation point if the change in the thermal conductivity of the surrounding regions lies within the tolerance range.

Also the beam deflection strategy, according to which the respective powder layer is scanned by laser beam in order to remelt the powder in some regions, can take into account the respective thermal conductivity of the defined immediate surrounding regions of the relevant irradiation points. Accordingly, the sequence of irradiation points can be selected for the irradiation of a respective layer taking into consideration the dimension determined from the geometry description data for the thermal conductivity of the defined, three-dimensional, immediate surrounding regions of the irradiation points. In this case the procedure is preferably such that the irradiation time per layer is as short as possible but, however, the uneven heating of regions of varying intricacy of the forming moulded body is avoided. In this case the laser beam is deflected, preferably so that its point of impact on the layer is shorter per unit of time in the region of finer moulded body structures than in the region of larger connecting regions with good thermal conductivity in a downwards direction. Such geometric guidelines for the beam deflection of the laser beam can also be stored in the datasets allocated to the irradiation parameters in order to optimise the process control.

The device according to the invention is designed and set up to perform the method, wherein the control apparatus is programmed for controlling the irradiation apparatus, so that in the irradiation steps d) the application of energy to selected points per unit of time to a respective irradiation point on the respective layer is selected as a function of the thermal conductivity of a defined immediate surrounding region of the irradiation point and is modulated automatically accordingly by setting irradiation parameters, such as the energy density of the radiation at the irradiation point and/or the duration of the irradiation of the irradiation point.

As an alternative to a conventional laser a radiation source, having a radiation source array or a beam deflection array, could also be used, which generates a parallel irradiation pattern on the powdered layer to be irradiated. In said irradiation pattern the individual array pixels can then generate, according to the basic concept of the present invention, an application of energy of varying strength into the powdered material, according to the thermal conductivity of the surrounding region of the relevant array pixel. Such an array radiation source can be used for example as a "preheating source" in addition to a laser beam.

The invention can also be applied in general to selective laser sintering (SLS), in which the powdered material is not completely melted or is only slightly melted on. The scope of protection also extends in this respect to corresponding SLS methods.

An embodiment of the invention is explained in more detail with reference to the attached drawings.

FIG. 3b shows a plan view of the surrounding region shown in FIG. 3a.

FIG. 4a shows the region denoted B in FIG. 2 in an enlarged view according to FIG. 3a.

FIG. 5a shows the region denoted C in FIG. 2 in a view according to FIG. 3a.

FIG. 6a shows the region denoted D in FIG. 2 in an enlarged view according to FIG. 3a.

Figure 1:
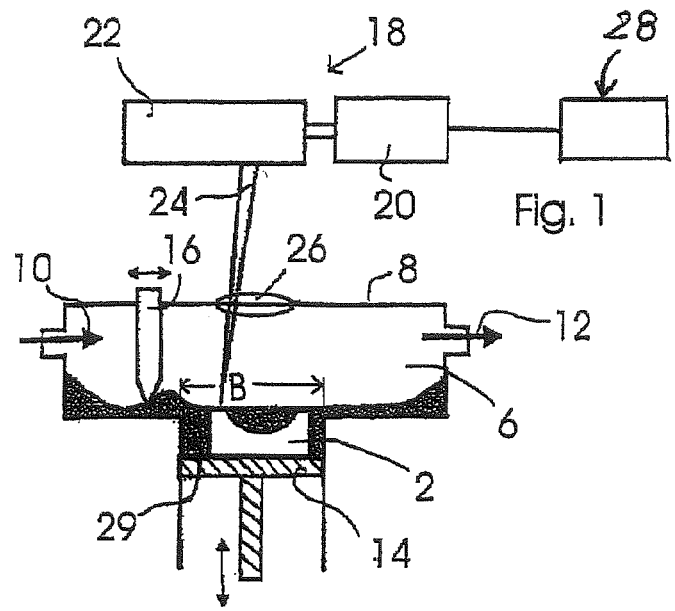
FIG. 1 shows a schematic diagram of a device according to the invention.

The explanatory diagram according to FIG. 1 shows a snapshot taken during the production of a moulded body 2 by building up layers of powdered material 4, e.g. steel powder, titanium powder, gold powder etc. or possibly also a mixed powder with a grain size of e.g. 10 μm-100 μm. The building up of the moulded body 2 is performed in a processing chamber 6 which is delimited by the processing chamber housing 8. In the processing chamber 6 there is an inert gas atmosphere, preferably an argon atmosphere, where arrow 10 in FIG. 1 indicates the inert gas inlet—and arrow 12 the inert gas outlet. The build-up in layers of the object 2 is performed on a support platform 14, which can be moved vertically by means of a vertical drive unit and can be positioned in different vertical positions. A smoothing slide 16 is used for preparing and levelling a new layer of powder on the most recently irradiated powder layer, wherein the smoothing slide is moved horizontally over the support platform 14 at a vertical distance therefrom according to the desired thickness of the powder layer relative to the most recently irradiated layer. After preparing this powder layer the irradiation apparatus 18 consisting of a laser 20 and radiation deflecting unit 22 is used in order to remelt by irradiation the powder at predetermined points according to the cross section of the moulded body to be produced allocated the powder layer. In the example the laser beam 24 is introduced through an f-theta lens 26 into the processing chamber 6, the lens 26 also serving as a window of the housing 8.

After completing the current irradiation process the support platform 14 is lowered by the desired powder layer thickness, after which the smoothing slide 16 spreads a new amount of powder over the building platform 14 to form the next layer to be irradiated. The aforementioned processes of irradiation and layer preparation are performed alternately until the object 2 is finished. A control apparatus 28 with a processing computer is used for controlling the building process, wherein it controls the scanning movement of the laser beam 24 by controlling the beam deflecting unit 22 according to the geometry description data of the moulded body 2.

Irradiation parameters, such as the power of the laser beam 24, the focussing of the laser beam 24 and the scanning speed of the laser beam 24 can be controlled by means of the control apparatus 28. By modulating at least one of these irradiation parameters, preferably a plurality of irradiation parameters, the energy application of the laser beam per unit of time into the respectively irradiated layer of powder at the beam point of impact, i.e. the respective irradiation point, can be changed according to a desired irradiation strategy. The respective energy density of the laser beam 24 at the beam point of impact can thus be varied as a function of the respective irradiation point. According to one embodiment of the present invention the energy density of the laser beam at the irradiation point on a respective layer is modulated as a function of the conductivity of a defined immediate surrounding region of the irradiation point. The lower the thermal conductivity in the surrounding region of an irradiation point, the smaller the application of energy to selective points per unit of time at the irradiation point, so that as far as possible the remelting process can be more even at the most optimum melting temperature. At irradiation points with a very good thermal conductivity of the surrounding region there is normally greater energy application per unit of time in order to allow the remelting process to take place in the desired manner. The thermal conductivity, i.e. the thermal conductivity of the powder, is usually much lower than the thermal conductivity of the solidified material of the forming moulded body 2, which material is solidified by remelting. If the current irradiation point is mostly surrounded by powdered material, during an irradiation process with an energy density that is too high there can be a build-up of heat at the irradiation point and an increase in temperature that is far above the melting point of the powder. In this case unwanted vaporising effects and melt spattering may occur. In regions in which a respective irradiation point is surrounded mostly by the already solidified material of the forming moulded body, the irradiation with the same energy density would possibly be just sufficient to remelt the powder at the irradiation point.

According to the present invention the rebuilding process is controlled by the control apparatus 28 such that the application of energy to selective points per unit of time to a respective irradiation point on a relevant layer is selected as a function of the thermal conductivity of a defined immediate surrounding region of the irradiation point and controlled by adjusting relevant irradiation parameters by means of the control apparatus 28.

With reference to the explanatory diagrams according to FIGS. 2-6b in the following the basic procedure is explained for determining the thermal conductivity of a respective defined immediate surrounding region at different irradiation points on a layer currently being irradiated.

Figure 2:
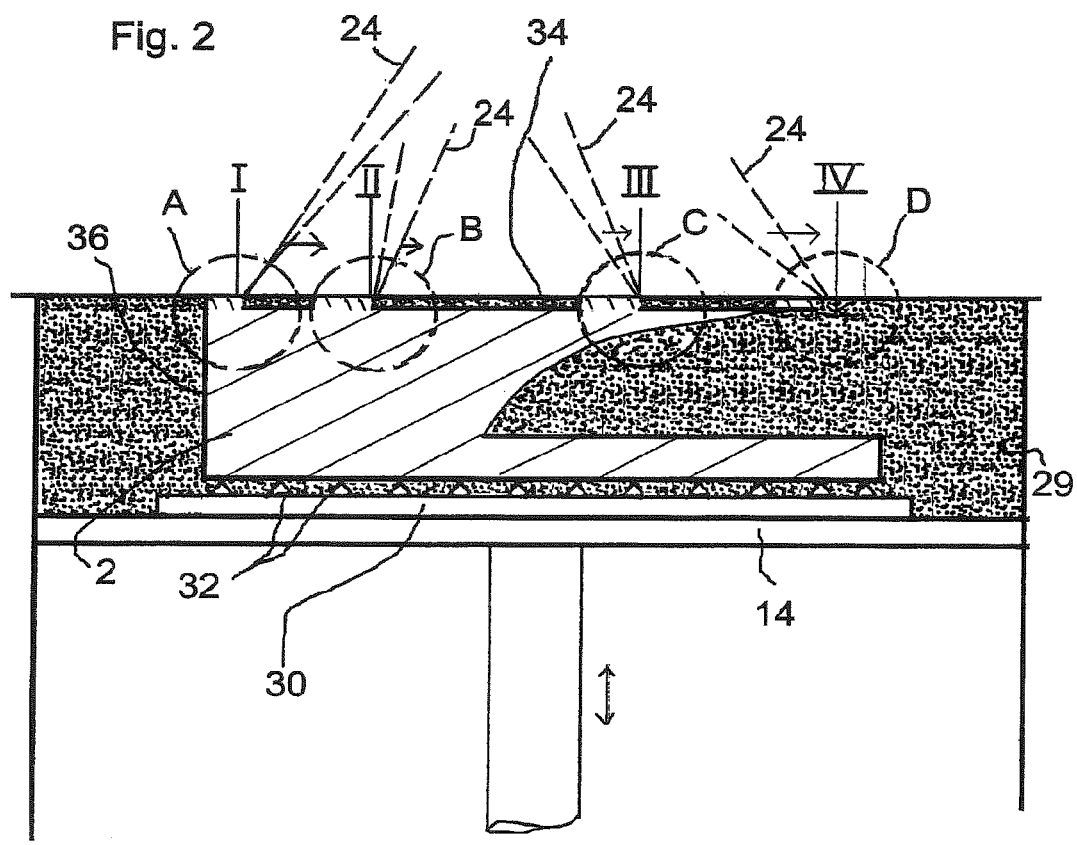
FIG. 2 shows an explanatory diagram illustrating the steps for determining a substitute variable for the thermal conductivity of surrounding regions of irradiation points by way of example.

FIG. 2 shows schematically in a sectional view a building cylinder 29 with a building platform 14 which can be lowered vertically therein, the respective position of which is controlled by a control apparatus (cf. 28 in FIG. 1). On the building platform 14 there is a substrate plate 30, on which the moulded body 2, already partly formed in FIG. 2, is built up in layers with the interpositioning of a support structure 32 also produced in the current building process according to the SLM method.

In the snapshot according to FIG. 2 the previously prepared upper powder layer 34 is irradiated by means of the laser beam 24. To explain this in more detail four randomly picked irradiation points I, II, III and IV on the layer 34 are considered. For the sake of simplicity it is also assumed that said four irradiation points lie on a straight laser track in the plane of the drawing, wherein the laser beam 24 in FIG. 2 is scanning the layer 34 from left to right and thereby inter alia also moves over the radiation points I-IV. Irradiation point I is close to the side edge 36 of the already formed part of the moulded body 2.

Figure 3A:
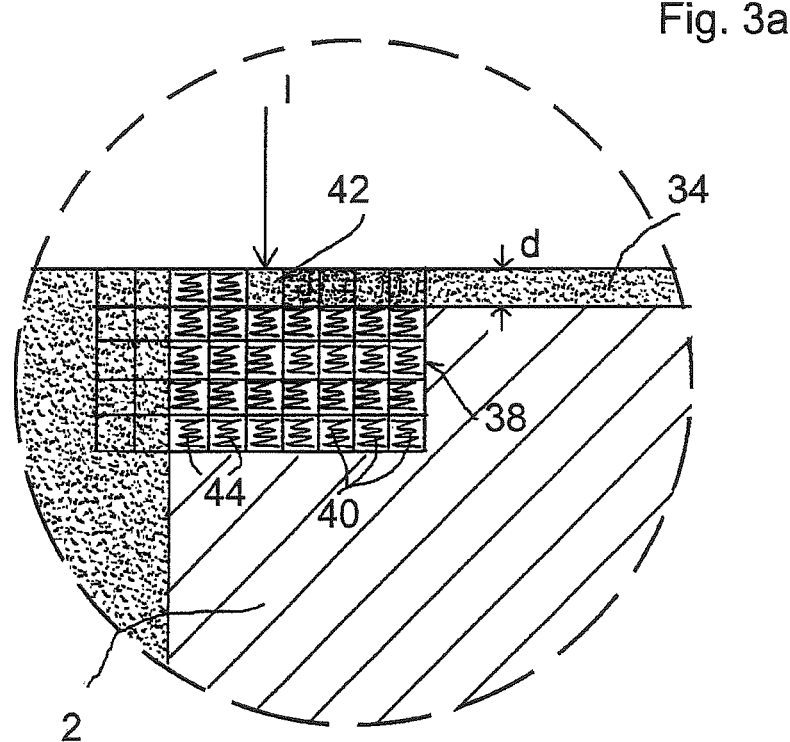
FIG. 3a shows the section denoted A in FIG. 2 in an enlarged view and showing theoretical volume elements (not to scale).

FIG. 3a shows the region marked A in FIG. 2 in an enlarged view, FIG. 3a also indicating a defined surrounding region 38 of the current irradiation point I as a grid. Said surrounding region 38 is below the irradiation point I, i.e. below the upper side of the currently irradiated layer 36. In the example the surrounding region 38 is a half cube, which is subdivided, by way of example, into 9×9×5 volume elements 40. The centre of the cube is determined by the volume element 42 at the radiation point I.

The volume elements denoted 44 and marked with wavy lines have already been solidified and form a corresponding region of the moulded body 2. The volume elements 44 marked by small dots contain powder and represent regions with a lower thermal conductivity than regions of already solidified material.

Figure 3B:
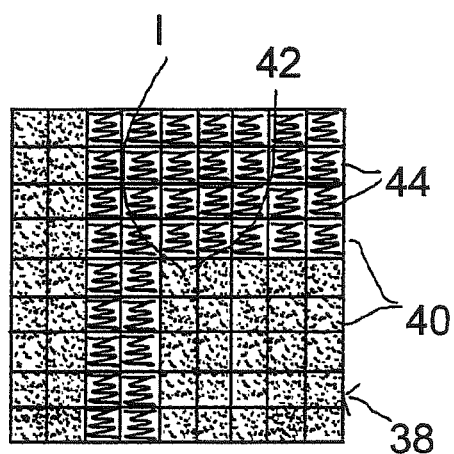

As a measure for the thermal conductivity of the surrounding region 38 of the current irradiation point I the amount, i.e. the number of volume elements 44 in the defined surrounding region 38 which have already been solidified is determined. FIG. 3b shows the surrounding region 38 in plan view on the upper side of the layer 34. Out of a total of 405 volume elements in the defined surrounding region 38 about 290 volume elements have already been solidified and thus form a relatively large cohesive sub-region with improved thermal conductivity.

Figure 4A:
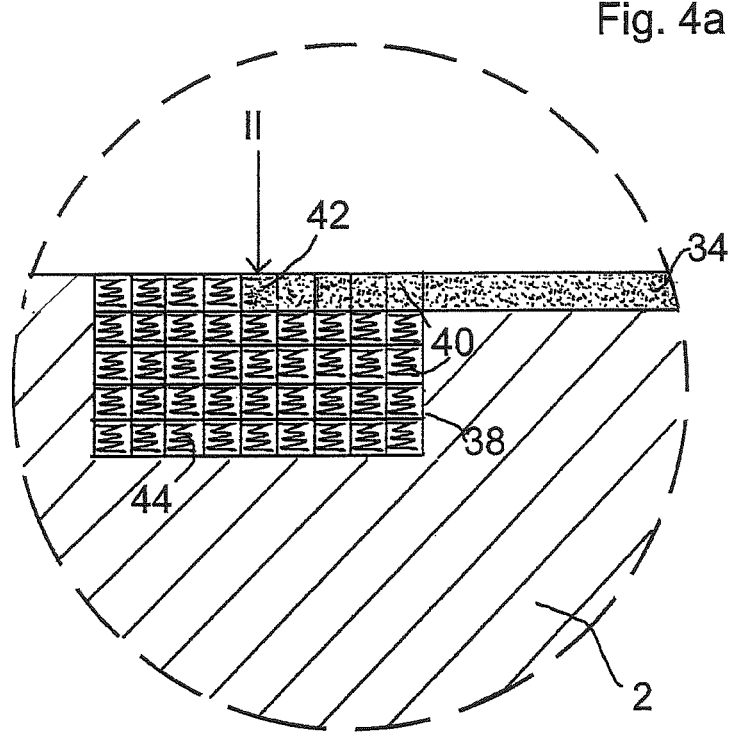
Figure 4B:
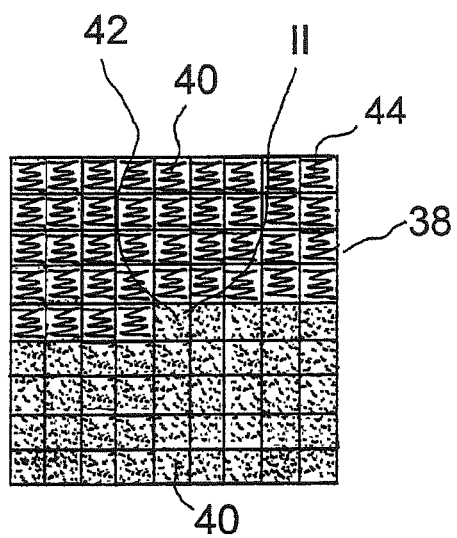
FIG. 4b shows the surrounding region of FIG. 4a in plan view.

FIGS. 4a and 4b show the defined surrounding region 38 for irradiation point II in side view and in plan view. The number of already solidified volume elements 40 in the surrounding region 38 of the irradiation point II is about 364 and is thus greater than in the situation shown in FIGS. 3a-3b. The surrounding region of the irradiation point II thus has better thermal conductivity than the surrounding region of irradiation point I.

Figure 5A:
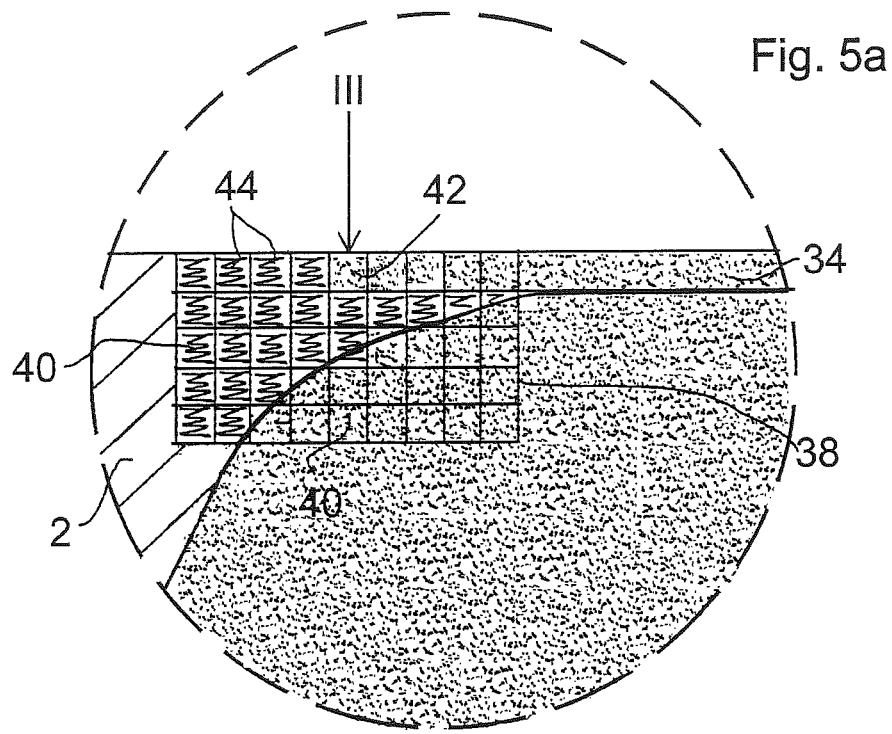
Figure 5B:
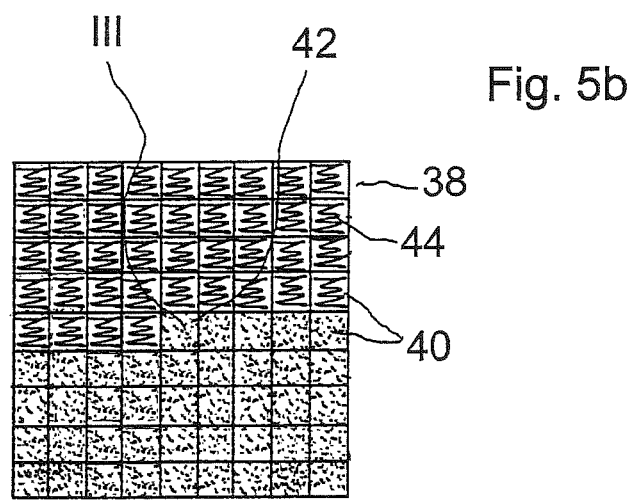
FIG. 5b shows the surrounding region of FIG. 5a in plan view.

FIGS. 5a and 5b shows the defined surrounding region of the irradiation point III. The number of already solidified volume elements is about 210, and therefore an even lower thermal conductivity is assigned to the surrounding region of the irradiation point III than to irradiation point I.

Figure 6A:
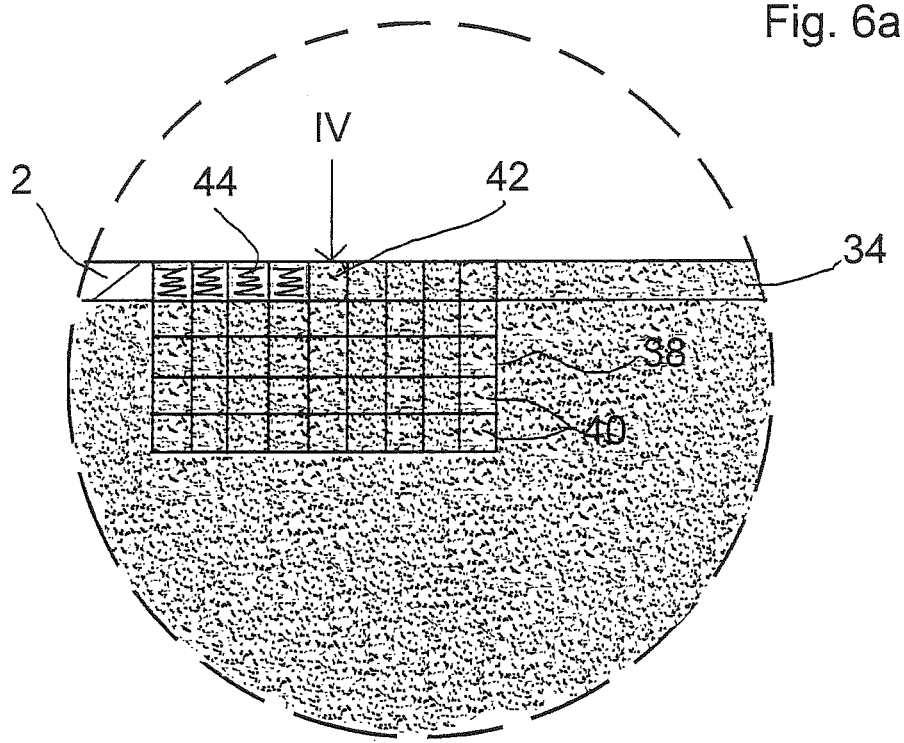
Figure 6B:
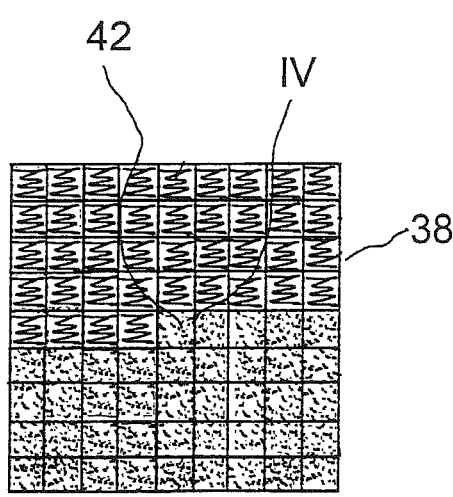
FIG. 6b shows the surrounding region of FIG. 6a in plan view.

The thermal conductivity of the surrounding region of irradiation point IV is even lower. In FIGS. 6a and 6b the defined surrounding region 38 of irradiation point IV is shown. There are only about 40 solidified volume elements in the surrounding region 38, said 40 volume elements all being in the currently irradiated layer. A particular feature of irradiation point IV is thus that the currently irradiated layer 38 only lies on powder of underlying powder layers.

In the example a half cube is selected as the defined immediate surrounding region of an irradiation point. In other embodiments of the invention said surrounding region can be for example a hemisphere, with the current irradiation point being in the centre of the sphere. Other shapes are possible for the defined immediate surrounding region.

In the shown example the volume elements are cubes. In other embodiments the volume elements can be configured as cuboids or spheres or the like. Preferably, the volume elements 40 are positioned precisely in the build-up layers of the structure, the volume element height corresponding to the layer thickness.

Thus in the example with cube-shaped volume elements 40 the edge length of the volume elements 40 corresponds essentially to the respective powder layer thickness d.

When determining the thermal conductivity of a relevant surrounding region 38 the number of already solidified volume elements 40 can be weighted further by other variables, such as how large the connection area is of already solidified volume elements to the volume element assigned to the respective irradiation point.

According to a preferred variant of the method according to the invention the complete moulded body is divided according to data into volume elements (voxel), which are preferably congruent with volume elements 40 (provided the latter are in the moulded body), and a respective irradiation point is assigned to each of said volume elements of the moulded body. To each thus determined irradiation point an irradiation parameter set is assigned which depends on the determined measurement of the thermal conductivity of the defined surrounding region of the irradiation point in the aforementioned manner. The irradiation parameter sets are preferably saved in association with the irradiation points and retrieved and considered by the control apparatus during the control of the irradiation process. In this case the sequence over time of the irradiation points can be optimised taking into account the outlined thermal conductivity properties.

As an alternative to defining such a data allocation structure the respective measure of thermal conductivity of a surrounding region can also be calculated in real time during the irradiation process by the control apparatus 28 and assigned to the respective irradiation point. It should also be noted at this point that the thermal conductivity does not need to be calculated physically in terms of thermal conduction, but as a measure for the thermal conductivity a substitute variable; in the simplest case the aforementioned number of solidified volume elements can be used in the respective surrounding region.

Figure 7:
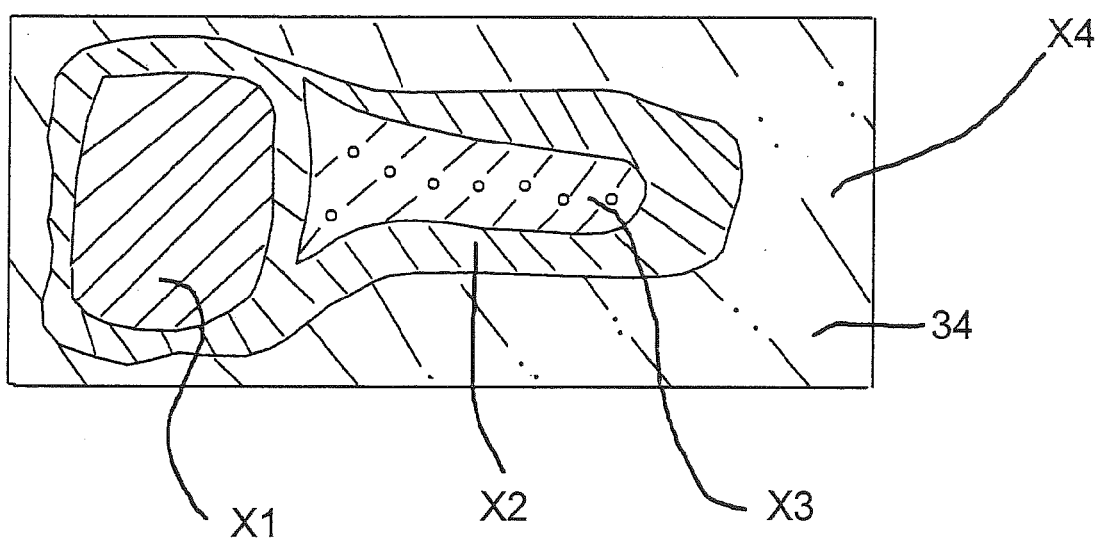
FIG. 7 shows qualitatively different regions of the current layer of FIG. 2 to be irradiated, wherein said regions are characterised by the different thermal conductivity of their surrounding regions.

FIG. 7 shows in a qualitative example in plan view the layer 34 currently being irradiated according to FIG. 2 regions X1, X2, X3 and X4, which differ according to the thermal conductivity of the surrounding region of the irradiation points therein. In region X1 the thermal conductivity of the surrounding region is the greatest and therefore in this region X1 the energy application per unit of time by the laser beam to the irradiation point is selected to be relatively high. The regions X2, X3 and X4 are characterised by the thermal conductivity of the surrounding region which decreases in order, so that in a corresponding manner the energy application by radiation per unit of time to the radiation point is selected to be correspondingly lower.

The individual regions X1-X4 are assigned respective tolerances of thermal conductivity, although according to the present invention a separate measurement for the thermal conductivity of its defined immediate surrounding region could be assigned to each individual voxel.

Preferably, in one respective region X1-X4 the selected irradiation parameter set is maintained. Thus for example in region X1 the laser power and the extent of the point of impact of the radiation is not changed and the beam is guided at an essentially constant speed over the region X1. The same applies accordingly to the respective irradiation parameter sets in the regions X2, X3 and X4.

Furthermore, the scanning track of the laser beam on the layer can be selected respectively according to further optimisation factors in order to temporarily accelerate the building process.

Thus it is also possible to assign specific geometry types of the scanning tracks or scanning track sections to different regions X1, X2, X3 and X4 in FIG. 7, wherein said geometry types (scanning vectors) are also saved in a memory in association with different regions X1, X2, X3, X4 so as to be retrievable by the control apparatus 28. This procedure is of course not limited to the example of FIGS. 2-7 but can be generalised.

The method according to the invention and the device according to the invention for performing the method thus enable an even remelting of the powder, so that evaporation effects, melt spattering effects and the like are suppressed as far as possible and the moulded body is built up without having critical mechanical stresses and is true to form according to the geometry description data. A support structure 32, as shown in FIG. 2, can also be incorporated into the building process according to the invention and into the considerations relating to thermal conductivity.

The invention claimed is:

1. Method for producing a moulded body by building up layers of powdered material, comprising the steps of:
   a) preparing a layer (34) of powdered material,
   b) heating the layer (34) using controlled radiation by irradiating selected points of the layer (34) according to a cross-sectional pattern of the moulded body (2) assigned to the layer (34) according to a geometry description data of the moulded body (2), so that the powdered material is solidified by melting to form connecting regions according to the cross-sectional pattern of the moulded body (2),
   c) preparing a next layer of powdered material (34) on the layer irradiated most recently,
   d) heating the most recently prepared layer (34) using controlled radiation by irradiating selected points of the most recently prepared layer (34) according to a cross-sectional pattern of the moulded body assigned to the most recently prepared layer, so that the powdered material is solidified by melting to form connecting regions according to said cross-sectional pattern of the moulded body (2),
   e) repeating steps c) and d),
   wherein an energy application to the irradiated selected points in step d) is varied per unit of time by a means of radiation according to a respective irradiation point on the most recently prepared layer (34),
   wherein the energy application per unit of time to the respective irradiation point in step d) is selected as a function of a thermal conductivity of a respective defined, immediate, three-dimensional surrounding region (38) of the respective irradiation point and is modulated automatically by setting irradiation parameters,
   wherein the irradiation parameters include an energy density of the radiation at the respective irradiation point, a duration of the irradiation at the respective irradiation point, or a combination thereof, wherein the thermal conductivity of the defined, immediate, three-dimensional surrounding region of the respective irradiation point is measured by determining a volume of material already solidified by melting powdered material within the defined, immediate, three-dimensional surrounding region based on the geometry description data of the moulded body, and wherein the energy application per unit of time to the respective irradiation point is selected to be greater as the thermal conductivity of the defined, immediate, three-dimensional surrounding region increases beyond a tolerance range.

2. Method according to claim 1, wherein the step of irradiating the selected points on a respective layer using controlled radiation is performed by a bundled laser beam (24), whereby a radiation power of the laser beam, an extent of a point of impact of the laser beam on the respective layer (34), a scanning speed of the laser beam at the respective irradiation point, or a combination thereof is adjusted based on a function of the thermal conductivity of the respective defined, immediate, three-dimensional surrounding region (38) of the respective irradiation point.

3. Method according to claim 1, wherein the measurement of the thermal conductivity of the defined, immediate, three-dimensional surrounding region of the respective irradiation point determined from the geometry description data of the moulded body used for automatically controlling the irradiation parameters is performed by a control apparatus (28).

4. Method according to claim 3, wherein the measurement of the thermal conductivity or values derived therefrom are saved in association with respective geometry description data of the respective irradiation points so that the measurement of the thermal conductivity or values derived therefrom can be read and processed by the control apparatus (28) in order to control the irradiation parameters.

5. Method according to claim 1, wherein the measurement for determining the thermal conductivity of the defined, immediate three-dimensional surrounding region of each respective irradiation point includes dividing each respective layer into a plurality of volume elements (40), wherein each volume element (40) includes a volume element height corresponding to the layer thickness (d), and the volume elements (40) are assigned to irradiation points so that each respective defined, immediate three-dimensional surrounding region and is defined by an assigned number of volume elements (40), and the measurement for determining the thermal conductivity of the defined immediate, three-dimensional surrounding region (38) includes accounting for a number of volume elements of material already solidified by melting powdered material.

6. Method according to claim 5, wherein the number of volume elements of material already solidified by melting powdered material in the defined, three-dimensional immediate surrounding region (38) of the respective irradiation point includes volume elements in layers below the layer (34) of the respective irradiation point.

7. Method according to claim 6, wherein the number of volume elements of material already solidified by melting powdered material in the defined, immediate three-dimensional surrounding region (38) of the respective irradiation point includes volume elements in the layer of the respective irradiation point.

8. Method according to claim 1, further includes assigning an irradiation parameter set to each irradiation point, wherein each irradiation set includes irradiation parameters depending on the thermal conductivity of the defined immediate, three-dimensional surrounding region of the respective irradiation point, and the irradiation parameter sets are saved in association with geometry description data of said irradiation points, so that the irradiation parameter sets are read and processed by the control apparatus (28) to control the irradiation processes.

9. Method according to claim 1, wherein the selection of the irradiation points during the irradiation of a respective layer (34) is based on the measurement of the thermal conductivity of the defined, three-dimensional, immediate surrounding regions determined from the geometry description data.

10. A device for performing the method according to claim 1, comprising
a processing chamber housing (8) with a support platform (14) for supporting the moulded body to be produced,
a layer preparation apparatus (16) for preparing respective powdered layers on the support platform (14),
an irradiation apparatus (18) for irradiating the most recently prepared layer on the support platform (14) according to the geometry description data of the moulded body to be produced, and
a control apparatus (28) for controlling the irradiation apparatus (18),
wherein the control apparatus is configured to control the irradiation apparatus by setting the irradiation parameters so that the application of energy to the selected points per unit of time is performed on the respective irradiation point on the respective layer (34) as a function of the thermal conductivity of the respective defined, three-dimensional, immediate surrounding region (38) of the respective irradiation point, and the thermal conductivity is determined from the geometry description data of the moulded body to be produced.

11. Device according to claim 10, wherein the irradiation apparatus (18) comprises a laser (20) and a beam deflecting unit (22) for controlling the deflection of a laser beam (24) emitted by the laser.

* * * * *